United States Patent
Lewis

Patent Number: 5,513,882
Date of Patent: May 7, 1996

[54] UNIVERSAL NON-THREADED PIPE CONNECTOR SYSTEM

[76] Inventor: Phil Lewis, 6701 Brompton, Houston, Tex. 77005

[21] Appl. No.: 315,770

[22] Filed: Sep. 30, 1994

[51] Int. Cl.⁶ .................................................. F16L 37/08
[52] U.S. Cl. ........................................ 285/305; 285/349
[58] Field of Search ................................. 285/305, 342, 285/343, 349, 55, 309

[56] References Cited

U.S. PATENT DOCUMENTS

| | | | |
|---|---|---|---|
| 568,432 | 9/1896 | Eisenhuth | 285/343 X |
| 753,595 | 3/1904 | Learned | 285/342 X |
| 2,021,241 | 11/1935 | Mall | |
| 2,057,771 | 10/1936 | Elkins | 285/305 X |
| 2,394,351 | 2/1946 | Wurzburger | 285/349 X |
| 2,431,268 | 11/1947 | McIntyre | 285/349 X |
| 3,185,501 | 5/1965 | Bowan et al. | 285/342 X |
| 3,698,747 | 10/1972 | Wing et al. | |
| 3,929,356 | 12/1975 | De Vinvent et al. | 285/305 |
| 3,976,791 | 8/1976 | Porta et al. | |
| 4,433,861 | 2/1984 | Kreczik | |
| 4,613,163 | 9/1986 | Grosshandler | 285/55 X |
| 4,723,796 | 2/1988 | Nattel | |
| 4,811,975 | 3/1989 | Paul, Jr. et al. | |
| 4,813,716 | 3/1989 | Lalikos et al. | |
| 5,040,831 | 8/1991 | Lewis | |
| 5,076,617 | 12/1991 | Bronnert | 285/349 |
| 5,350,203 | 9/1994 | McNaughton et al. | 285/305 X |
| 5,366,259 | 11/1994 | Hohmann et al. | 285/305 |

FOREIGN PATENT DOCUMENTS

| | | | |
|---|---|---|---|
| 366803 | 1/1923 | Germany | 285/305 |
| 3642149 | 7/1981 | Germany | 285/305 |
| 39091 | 9/1936 | Netherlands | 285/342 |
| 902447 | 8/1962 | United Kingdom . | |
| 2268238 | 1/1994 | United Kingdom | 285/305 |

*Primary Examiner*—Randolph A. Reese
*Assistant Examiner*—Heather Chun Shackelford
*Attorney, Agent, or Firm*—Michael L. Parks

[57] ABSTRACT

A universal non-threaded pipe connector system for connecting multiple types of conduit, tubing, hose, and pipe comprising a first tubular member for a fluid, at least one raised surface on the tubular member substantially perpendicular to the axis of connection of the first tubular member; a second tubular member having an inside diameter larger than the outside diameter of the at least one raised surface on the first tubular member substantially perpendicular to the axis of connection for receiving the first tubular member and the at least one raised surface on the tubular member, at least one seal between the one raised surface on the first tubular member and the second tubular member forming a seal there between and a member for controlled compression of the seal between the second tubular member and the at least one raised surface on the first tubular member and for connecting the first and second tubular members.

15 Claims, 7 Drawing Sheets

UNIVERSAL NON-THREADED PIPE CONNECTOR SYSTEM

BACKGROUND OF THE INVENTION

This invention relates to a universal system for connecting tubular members for flowing fluid without the use of a threaded connection. The tubes can be formed from conduit, tubing, pipe, hose and any other means which will form a tubular member for the flowing of fluid. These pipes are held together and formed to provide for controlled compression of the seal without the use of a threaded connection and/or threaded nut for creation of the controlled compression of the conduit and connection seal. The controlled compression is created by control of the dimensions between the seal and the members to be sealed and the member used to drive the at least one raised surface on the first tube which is perpendicular to the axis of connection of the tube against the seal and the second tube in a controlled manner and then provides for the holding of the first and second tubular members together after the member used to drive the at least one raised surface into sealing engagement is inserted.

This invention further creates a universal non-threaded pipe connector system for all types of piping, tubing whether it is made of plastic, metal or otherwise, without having to utilize threads and for providing a seal which is as substantially equal to one found in a threaded type connection.

This invention further provides a means whereby composite pipes, or pipes of two materials may be used such as plastic on the inside diameter and aluminum or other metal being used on the outside of the pipe to achieve a connection which provides both corrosion resistance and strength in all types of temperatures and environments.

This invention also provides a universal non-threaded pipe connector which can also serve as a quick release and reconnect fitting having broad applications.

While there have been many prior art patents which have utilized various types of "U" shaped members, "C" shaped members, pins, brads, some of which are round and some are flat, nevertheless these prior members required that the pipe to be joined have a channel surface or a groove pre-cut therein, or that the "U" shaped clip member in fact make a groove for the joining process. Some "V"-shaped clips were required to engage a groove or fit within a pre-determined hole on the second pipe for forming a union or mechanical locking to prevent the inserted pipe from backing out once the piping system was pressurized.

For example, U.S. Pat. No. 5,040,831 provides a "U" shaped clip which in fact deforms the pipe to form an edge between the "U" shaped clip and pipe which is inserted into the fitting and thus prevents the pipe from backing out once the piping system was pressurized.

Further, such patents as U.S. Pat. No. 4,433,861 provided for means for deforming a metal pipe to form a tight connection. However, in this patent the receiving pipe member was provided with a groove which defined internally of the receiving pipe member for receiving the tension tube. This internal defined groove provided means for driving the tension tube into the surface of the connector for making the connection. This connector is very expensive to manufacture. The internal groove is used to drive the legs of the hoop into the surface of the pipe to hold it and to prevent the spreading forces generated when the pipe is pressurized from backing the pipe out of the connection. Further, this patent provides for deformation of the pipe in the vicinity of the tension hoops such that the deformation prevents the pipe from disconnecting once the tension hoops have been driven in.

Also, pipe connectors of the prior art have had machined grooves in the pipe, which required pipe to be thicker-walled pipe. This thickness added was required because pipe is rated based on a finished wall thickness and providing a notch requires additional walled thickness after it was machined to keep the pipe in a proper specifications at the point of the machined notch which made such pipe more expensive.

Prior art pipe connectors also had to be made out of metal and required specialized equipment in the field for their installation or threading and connectors had to have very exacting tolerances for the system to be fitted together and have the clips and grooves installed in field connections match up and align for proper connection.

Further, in the prior art, connectors had to be made for pipes based on the type material from which the pipe was made. Each type connector required a design for the particular material being used in the pipe and its connection thereby preventing the use of a universal type fitting which could be used in all type of pipe.

SUMMARY OF THE INVENTION

The prior art has produced many types of quick release systems for rapid connection and disconnecting utilizing various forms of clips and/or clamping devices. However, in nearly all cases these members are threaded about the pipe or passed through a slot and designed to engage a pre-machined groove in the member to be connected. In some cases, it actually deforms the member to be connected. In the case of the pre-machined groove art, it requires a great deal of machine precision in order to have the holes aligned with the clip mechanism and that can be very expensive. Further, it made field installations very difficult. In the case of the deforming type connectors, the clips have to be made out of special material and have highly machined edges in order to deform the material for proper connection. Also, because the field assembly environments are less than ideal, the tolerances for error is great and creates great problems in the use of such connectors in the field.

One object of this invention is to utilize coupling members of different types of materials which can be used for forming a seal and which do not require expensive parts in order to form the connection.

A further object of this invention is to provide a connection which can be readily taken apart, re-cut and re-sized with inexpensive equipment in the field and then rejoined where needed to achieve an effective seal.

It is yet a further object of this invention to provide a connector system which is universal in its application to all types of tubes, materials, pipe whether plastic, or bimaterial type products which can be connected using this system.

It is also an object of this invention to provide a connector system which can be made with relatively thin walled tubing or thick walled tubing.

It is yet a further object of this connector system that it does not require that the pipe be thicker for the purposes of keeping its rating when the connector system is used because it does not require a machined groove be cut in the pipe to form a connection.

It is a further object of this invention to provide a "U" shaped clip member which has no specialized cutting or deforming surface but only an inclined leading edge which provides for the controlled compression of the surfaces between the seal to form a seal but does not require the deformation of the surface of the first pipe member.

It is the object of this invention to provide no deformation in the pipe by the "U" shaped clip member so that there is no damage done to the pipe during its connection to the second pipe connector member.

Other objects can be more apparent from the following descriptions wherein referenced have been made to the accompanying drawings.

BRIEF DESCRIPTION OF THE DRAWINGS

An embodiment of this invention can be seen in the drawings wherein.

DESCRIPTION OF THE PREFERRED EMBODIMENTS

Figure 1:
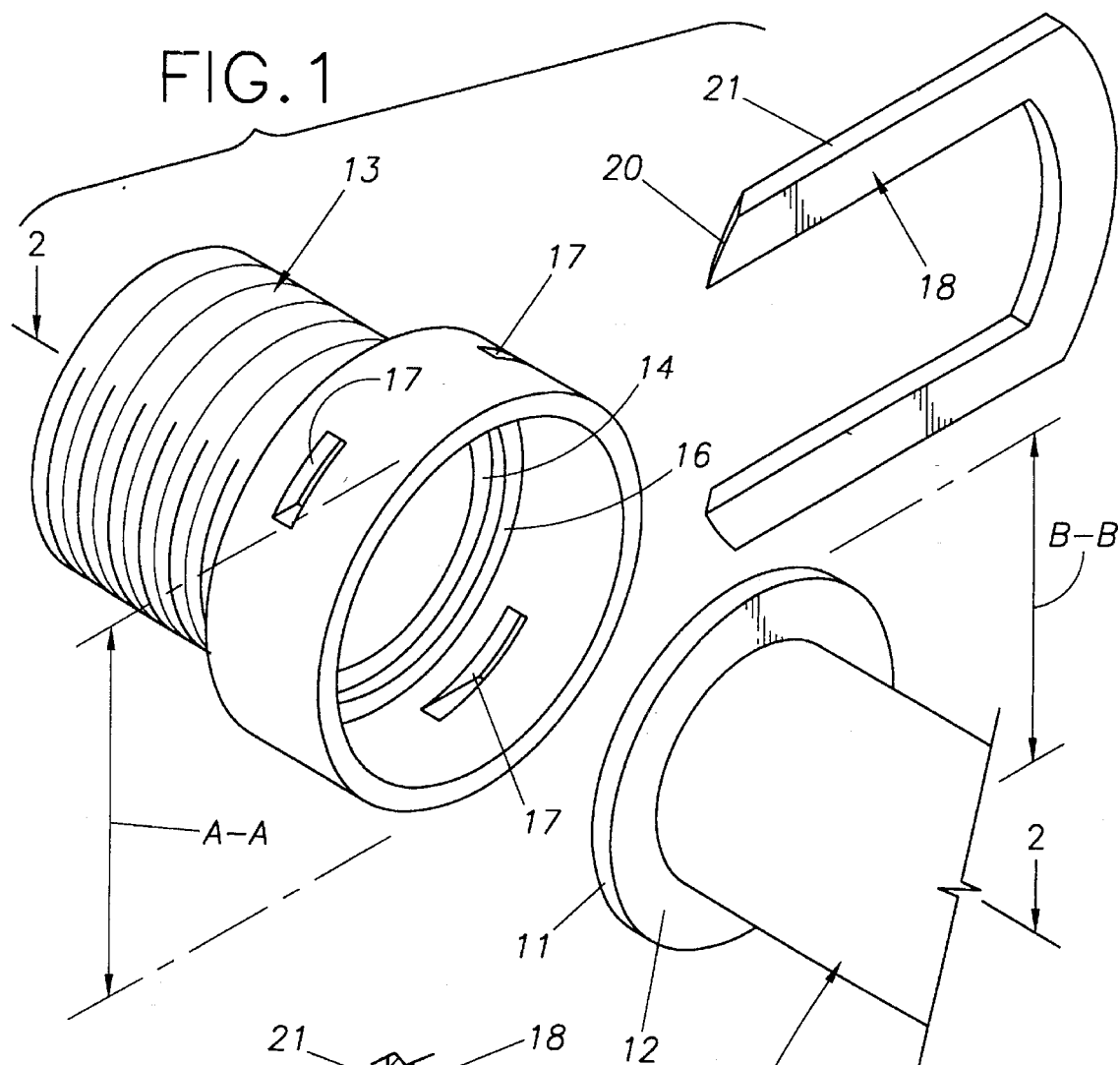
FIG. 1 is a perspective view of the first tubular member, at least one raised surface on the first tubular member, and a second tubular member, at least one seal and one embodiment of a controlled compression member for controlled compression of the at least one seal and the connection of the first tubular member and the second tubular member.

Referring now to FIG. 1, the general reference 10, shows the first tubular member for fluid. In this embodiment the at least one raised surface 11 is formed from the first tubular member for fluid 10 by the end of the first tubular member 10 being flared out to form a flared end 12 which becomes the at least one raise surface 11 substantially perpendicular to the axis of connection of the first tubular member 10. This flaring operation can be preformed in the field, as those skilled in the art will be aware because there is much equipment available to create substantially 90 degree flares in tubing for the formation of a flared end 12. This means that in the installation process all that is needed is a cutting device for the first tubular member 10 and a flaring tool and the first tubular member 10 is ready for connection. This process thus eliminates the need for a threading operation, which is very time consuming and requires costly equipment.

The second tubular member, generally referred to at 13, is provided in the embodiment shown in FIG. 1 with an inside diameter, as representational shown from A—A, larger than the outside diameter, as representational shown from B—B, of the at least one raised surface 11 referred to as flared end 12 for receiving the first tubular member 10 and the at least one raise surface 11 therein. Also in the FIG. 1 embodiment an at least one seal 14 is provided. This at least one seal 14 is positioned for forming a face sealing arrangement with the flared end 12, when the flared end 12 is put in place inside of the second tubular member 13. The at least one seal 14 is secured in position in this embodiment by a circular seal seat 15, which is located on a shoulder 16 which is machined into the second tubular member 13. Also machined into the second tubular member 13, as shown in this embodiment, are at least two pair of apertures 17. It should be understood that a pair of slots, could serve the function of the at least two pair of apertures 17, as will be shown in other embodiments.

Figure 5:
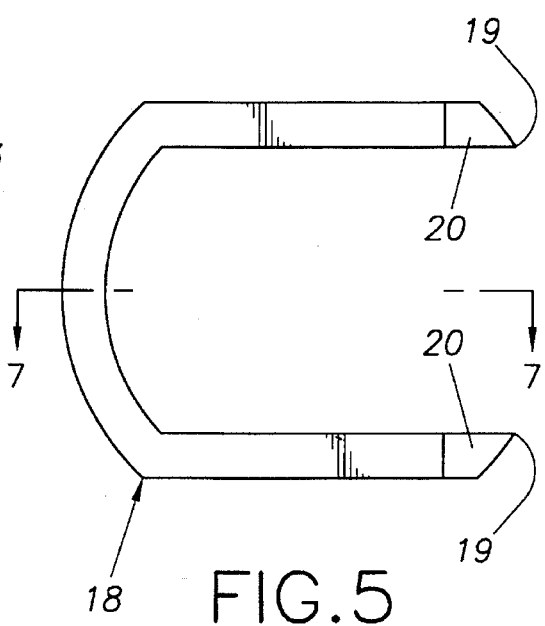
FIG. 5 is a side elevation view of one embodiment of the member for controlled compression of the at least one seal means and connection of the first tubular member and the second tubular member.
Figure 6:
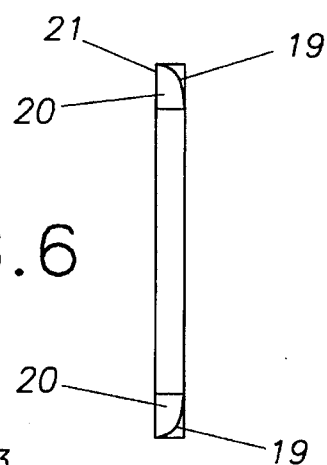
FIG. 6 is a front elevation view of one embodiment of the member for controlled compression of the at least one seal means and connection of the first tubular member and the second tubular member.
Figure 7:
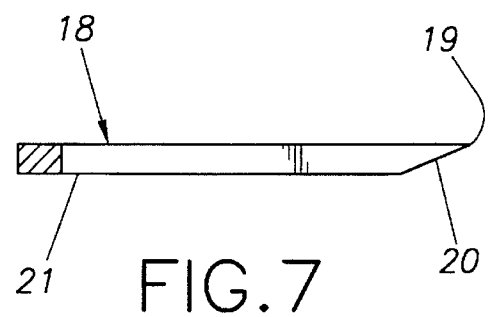
FIG. 7 is a top elevation view of one embodiment of the member for controlled compression of the at least one seal means and connection of the first tubular member and the second tubular member.

Also provided as shown generally at 18 is a U-shaped Clip, which can best be seen in FIGS. 5, 6, and 7. The U-shaped clip 18 has at least two inclined surfaces 19 which are located along the leading edges 20 of the U-shaped clip 18 and incline from the leading edge 20 which is relatively thin to the full thickness 21 of the U-shaped clip 18. It should be understood that the shape of the U-shaped clip 18 could be round or flat, however as shown in this embodiment it is substantially flat, but in any event the U-shaped clip 18 must be sized to pass through the apertures 17 for forming a good fit therethrough.

Figure 2:
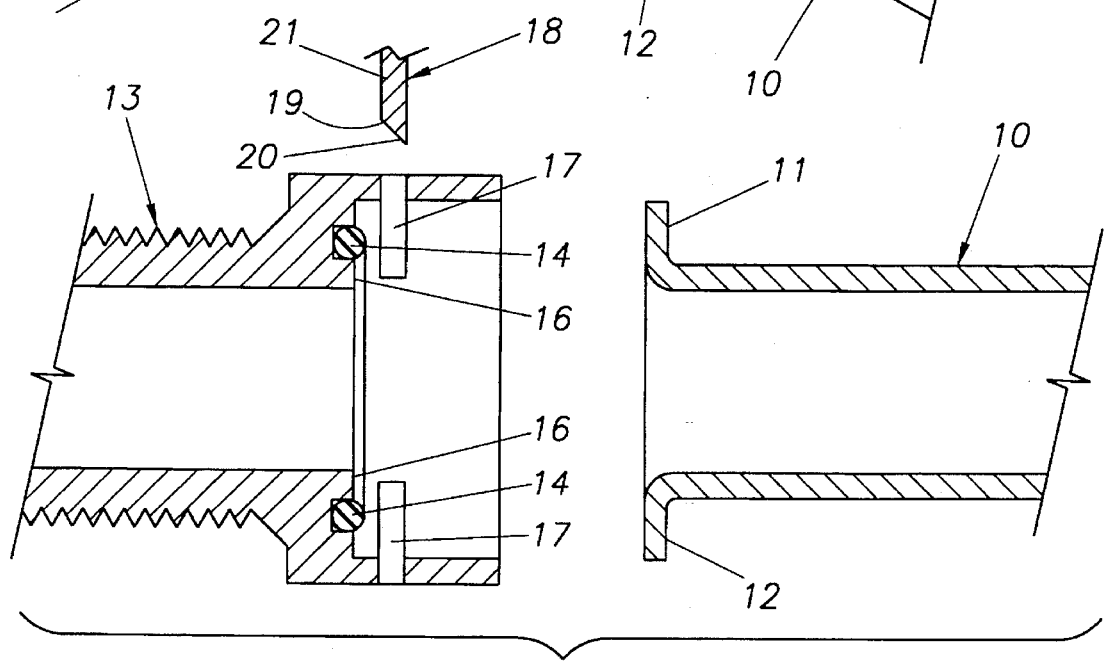
FIG. 2 is a cross sectional view of FIG 1 taken through FIG. 1 at points 2—2.
Figure 3A:
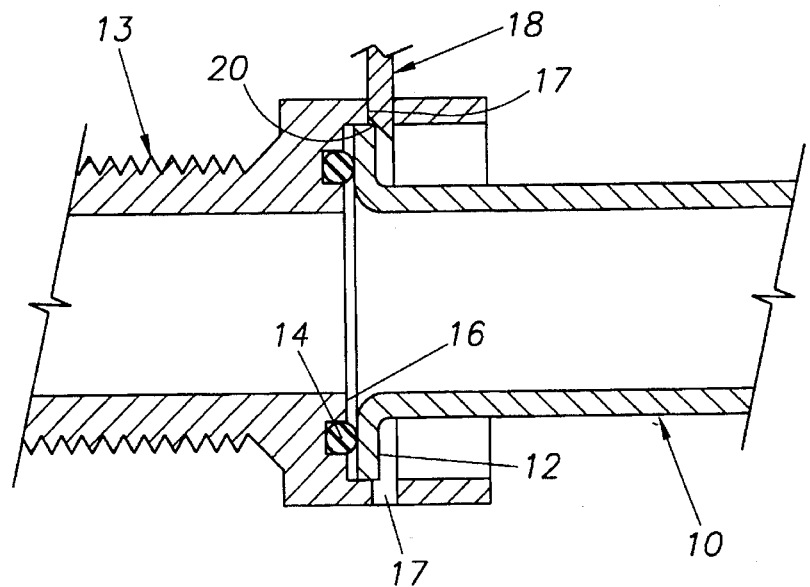
FIG. 3A is a diagrammatic sectional view of FIG. 2 showing the assembly of the elements of one embodiment of this invention in the beginning stages of assembly.
Figure 3B:
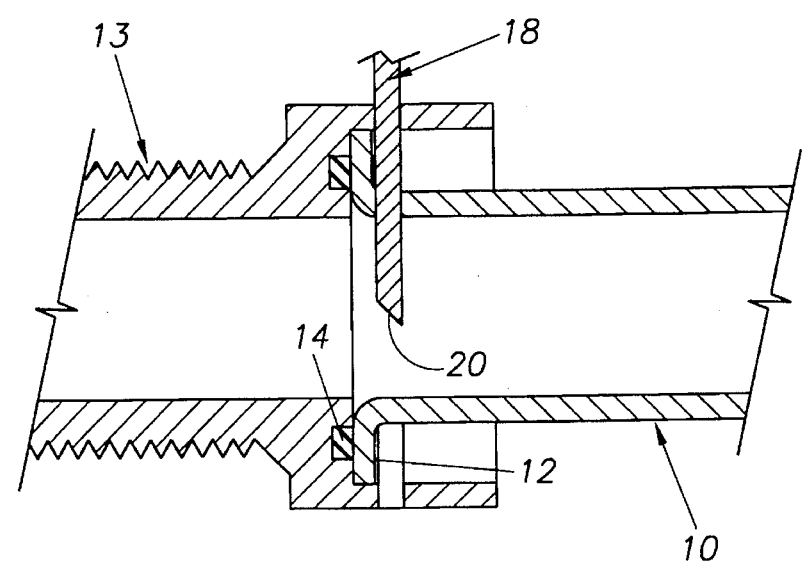
FIG. 3B is a diagrammatic sectional view of FIG. 2 showing the assembly of the elements of one embodiment of this invention in the mid stage of assembly.
Figure 3C:
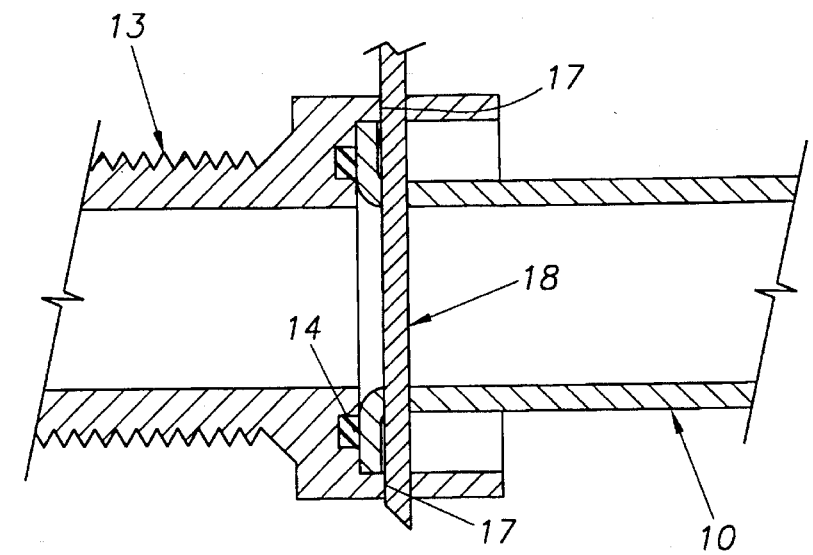
FIG. 3C is a diagrammatic sectional view of FIG. 2 showing the assembly of the elements of one embodiment of this invention in the finished stage of assembly.

By referring to the FIGS. 1 and FIG. 2 it will be recognized that these figures show the elements of one embodiment of this invention in position to be assembled. Referring to FIGS. 3A, 3B, and 3C, these figures show stages of assembly of the universal non threaded connector of this embodiment from the beginning stage in 3A, to the intermediate stage 3B, and the final stage 3C.

In the beginning stage as shown in FIG. 3B the first tubular member 10 is inserted into the second tubular member 13 and seated against the at least one seal 14 and the shoulder 16. Then the U-shaped clip 18 is inserted into the one pair of apertures 17 on one side of the second tubular member 13 and started to be driven through the one pair of apertures 17 on the one side of the second tubular member 13 to the other one pair of apertures on the other side of the second tubular member 13. It should be noticed that in this embodiment the leading edges 20 of the U-shaped clip 18 are positioned so that the relatively thin portion of the leading edges 20 engage the at lease one raise surface 11, which in this embodiment is the flared end 12 of the first tubular member 10 along the surface opposite the surface which is positioned against the at least one seal 14. Thus as the U-shaped clip 18 is moved across from one pair of apertures 17 to the other one pair of apertures 17 the at least two inclined surfaces 19 which are located along the leading edges 20 of the U-shaped clip 18 and incline from the leading edge 20 which is relatively thin to the full thickness 21 of the U-shaped clip 18 gradually increase the pressure exerted on the at least one raised surface 11 which in this embodiment is flared end 12 for the creation of controlled compression of the at least one seal 14 against the flared end 12.

Figure 4:
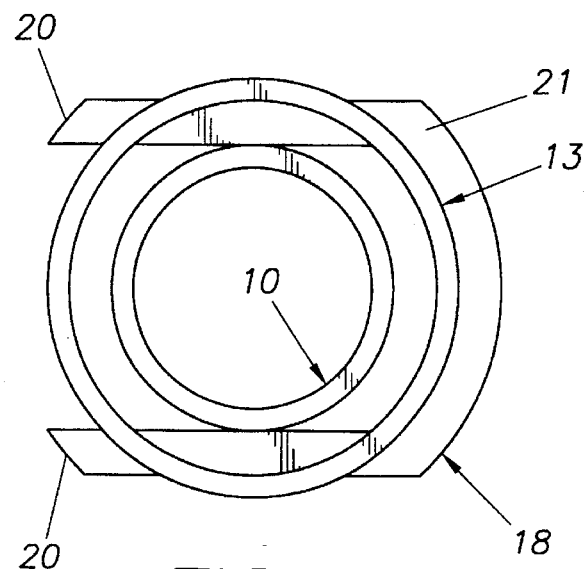
FIG. 4 is an end view of the finished stage of assembly from the first tubular member side of the assembled connection.

In FIG. 3C it will be seen that the U-shaped clip 18 is fully inserted through the second tubular member 13 and the leading edges 20 of the U-shaped clip 18 have passed at least into or through the at least one pair of apertures 17 on the other side from where the U-shaped clip 18 was started for the formation of the universal non threaded connection. FIG. 4 shows the finished connection also.

It will be appreciated by those skilled in the art that to achieve the controlled compression of the at least one seal 14 with the other parts of this invention there are critical dimensional relationships between the elements of this invention to achieve the results of this invention. Some of the elements which must be considered are, the effective width of the member for controlled compression, which in one embodiment is the U-shaped clip 18; the dimensional relationship of the at least one seal 14 from the shoulder 16 and the resilience characteristics of the at least one seal 14; the distance of the at least one pair of apertures 17 from the shoulder 16; and the effective width of the at least one raised surface 11. As will further be understood by those skilled in the art the above elements will be interrelated such that a change in one will cause a change in the other or visa versa. For example the dimension from the shoulder 16 to the at least one pair of apertures 17 would be adjusted depending on how high the at least one seal 14 extended above the shoulder 16 and the effective thickness of the member 18 for controlled compression from its leading edge 20 to it full effective thickness 21, which in this embodiment determines how much controlled compression is achieve in combination with the other elements by advancing the at least one raised surface 11 from its starting position to its final controlled compression against the at least one seal 14. It should be understood that it is its effective thickness which controls, as for example in the embodiment of FIG. 11, 12, 13, 14, and 15 a different effective thickness is achieved for driving the at least one raised surface 11 against the at least one seal 14 to achieve the controlled compression of the at least one seal 14, but the same teaching is applied. Also the thickness of the at least one raised surface 11 will affect the dimensions between the shoulder 16 and the at least one pair of apertures 17, such that generally the thicker the at least one raised surface 11 the greater the dimensional space needed between the shoulder 16 and the at least one pair of apertures 17. As set out above the member 18 for controlled compression must have a good fit with the second tubular member 13 because it must be stopped against the second tubular member 13 before it can apply controlled pressure against the at least one seal 14 by advancing the at least one raised surface 11 with its at least two inclined surfaces 19 starting with the leading edges 20. As those skilled in the seal art will appreciate, the desired controlled compression is within a range of from 5% to 50% on the seal, which will vary with the type seal and how it is compressed. As will be appreciated in this invention, by those skilled in the art, the height of the inclined surfaces on the member 18 for controlled compression will vary relative to the position of the seal 14 and the apertures 17 for receiving the member 18 and stopping the member 18 so that the beginning surface 20 and member 18 can start the compression and compression can continue up to the full thickness of the member 18. To provide a range of from 5% to 50% compression upon the seal 14, it should be obvious that the only effective force in creating the 5% to 50% compression is the height of the inclined surface relative to the stopping of the member 18 and the at least one raised edge substantially perpendicular to the axis of connection. Other dimensional relationship and how they may be adjusted will become more apparent from other embodiments which will be more fully described herein.

Figure 8:
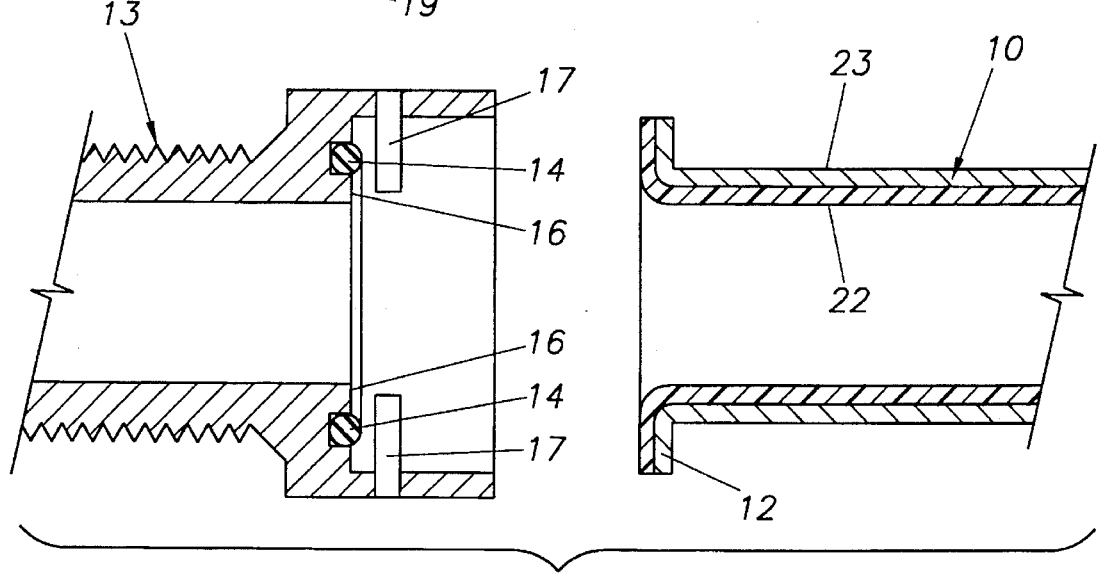
FIG. 8 is a cross sectional view of another embodiment of the of first tubular member and the at least one raised surface on the first tubular member where the first tubular member is made of two materials one on the inside and one on the outside, and where the one on the inside may form the at least one seal means.

In the embodiment shown in FIG. 8 the first tubular member 10 is made of a bimaterial, as for example the inner liner 22 may be made of a plastic material to resist corrosion and the outer liner 23 made of a metal such as aluminum for strength and temperature resistance. In such an application, as shown in FIG. 8, the flared end 12 has the plastic inner liner 22 turned to meet the shoulder 16 and the plastic inner liner 22 may also serve the function of a least one seal 14 between the second tubular member 13 and the one raised surface 11 on the first tubular member 10 substantially perpendicular to the axis of connection and for connecting the first and second tubular members 10 and 13. In this embodiment the critical dimensions change as there is no seal dimension on the shoulder 16 to be considered and only the thickness of the flared end 12 of the bimaterial would be considered in establishing the critical dimensional relationships above discussed. This use of a bimaterial for the first tubular member 10 has many improved benefits such as the providing of corrosion resistance and the ability to use plastic material in hot environments, with out the characterized thermal creep associated with plastic materials used in high temperature environments. The connection of these pipes in FIG. 8 is achieved in the same way as shown above.

Figure 9:
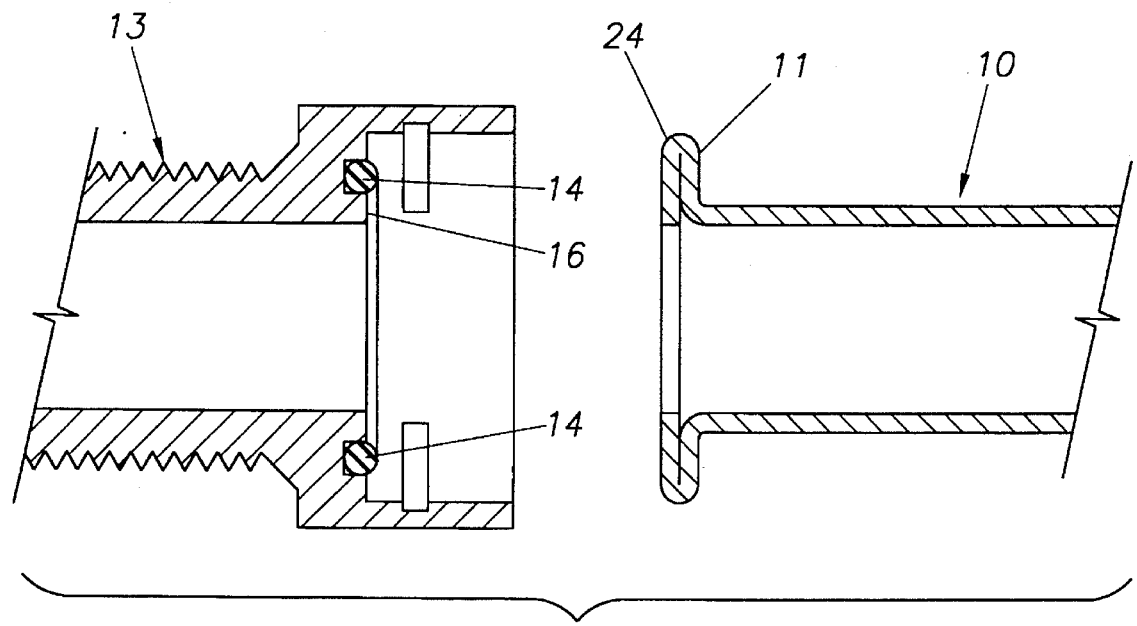
FIG. 9 is a pre-assembly cross sectional view of another embodiment of the of first tubular member and the at least one raised surface on the first tubular member which is formed from the first tubular member by the forming of a bead on the first tubular member.
Figure 10:
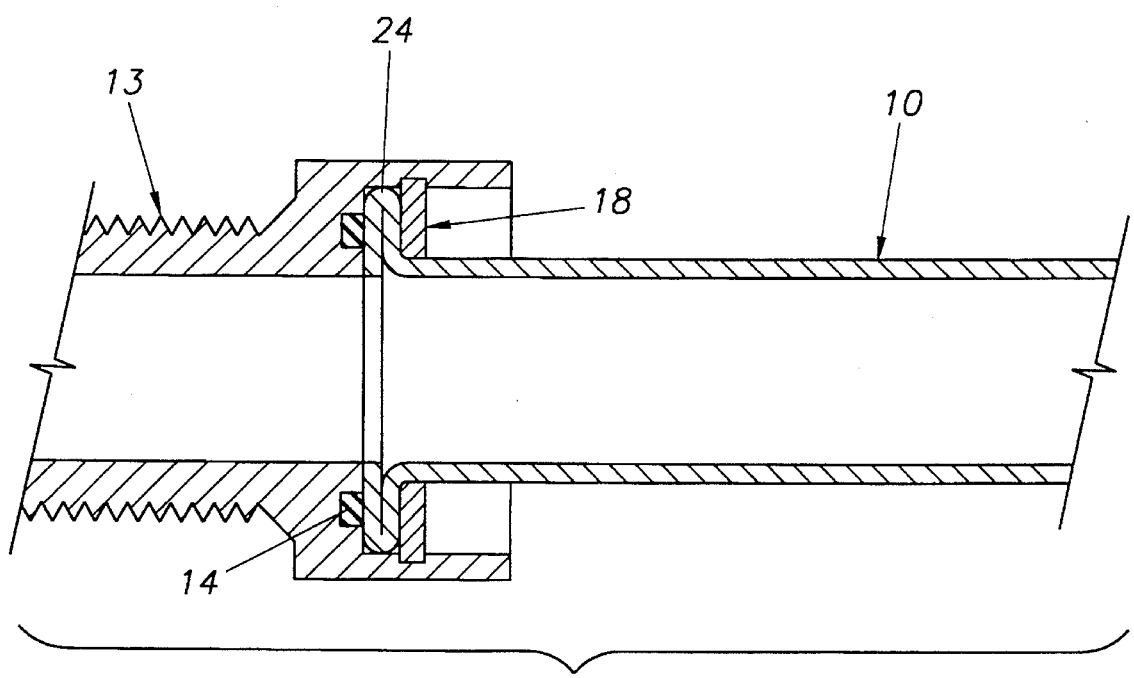
FIG. 10 is an assembled cross sectional view of another embodiment of first tubular member and the at least one raised surface on said first tubular member being formed from the first tubular member by the forming of a bead on the first tubular member.

In the embodiment shown in FIG. 9 the first tubular member 10 has the at least one raised surface 11 formed on said first tubular member substantially perpendicular to the axis of connection by the end of the first tubular member 10 having a bead 24 formed on the end of the first tubular member 10. This bead 24 may be formed by crimping the end of the first tubular member 10 on itself to form at least one raised surface 11 on the first tubular member 10. Clearly the dimensional considerations must be considered here as the thickness of the bead 24, which has been created by the first tubular member 10 being doubled back on itself, may cause the positioning of the apertures 14 and the shoulder 16 at yet different positions as can be seen in FIG. 10 in the completed connection.

Figure 11:
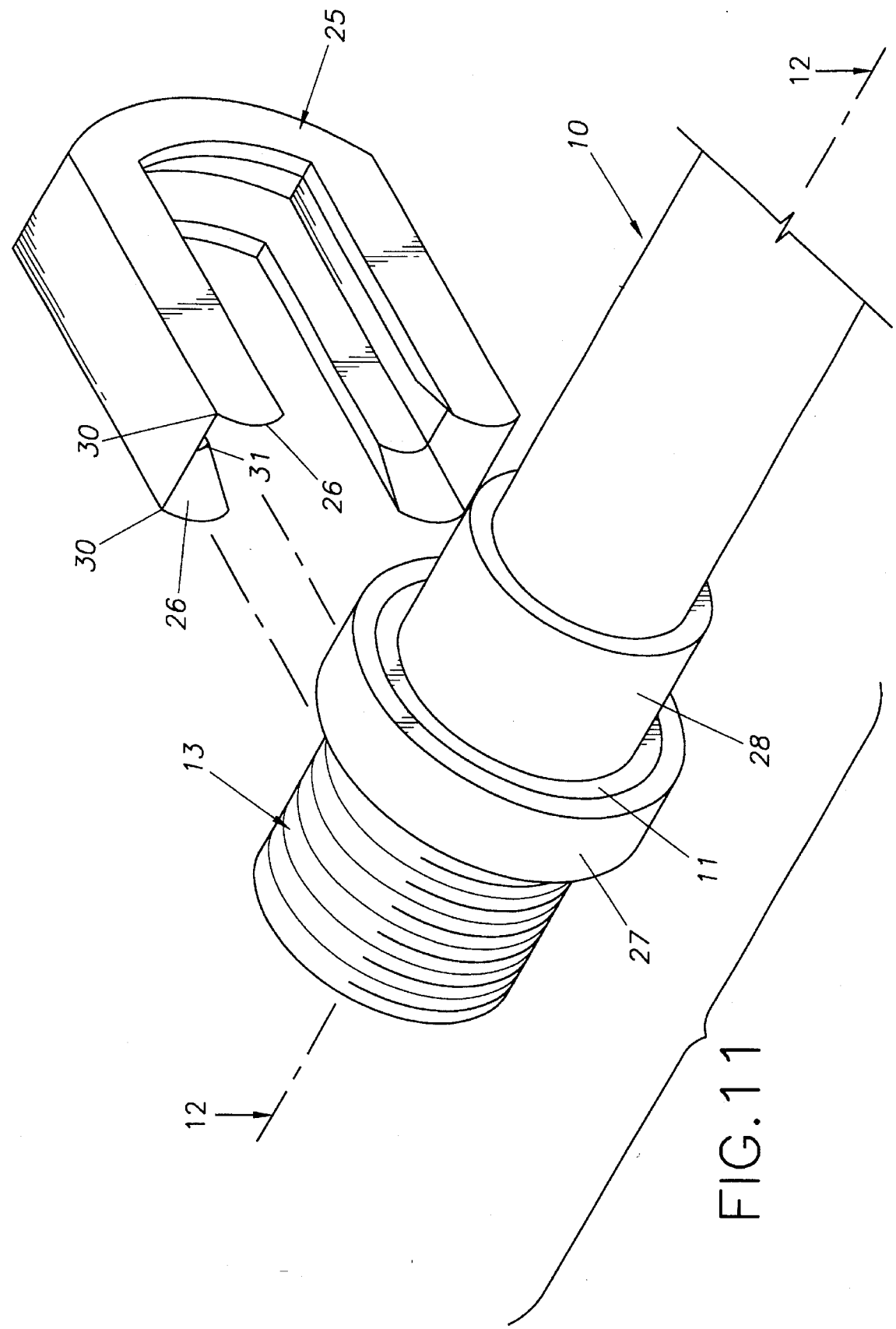
FIG. 11 is a perspective view of another embodiment of the first tubular member, at least one raised surface on the first tubular member, and a second tubular member, at least one seal and another embodiment for a controlled compression member for controlled compression of the at least one seal and the connection of the first tubular member and the second tubular member.
Figure 12:
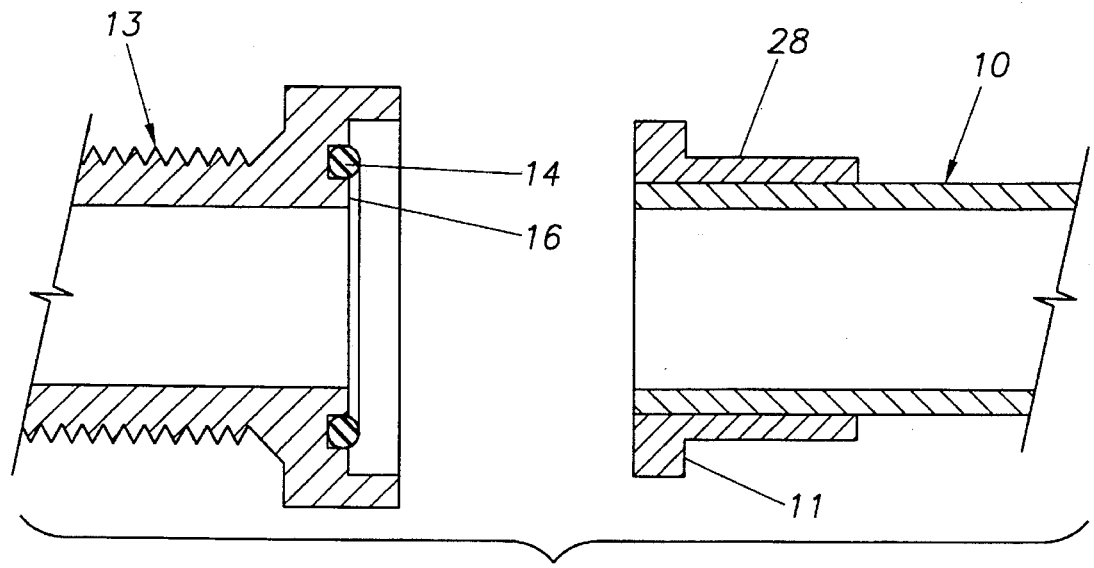
FIG. 12 a cross sectional view of FIG. 11 taken through FIG. 11 at points 12—12.
Figure 15A:
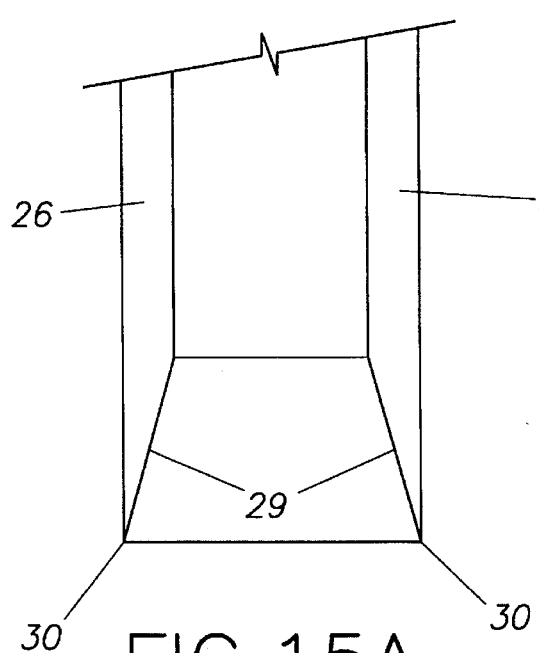
FIG. 15A is an enlarged view of FIG. 14 taken at 15A—15A at the front edge of another embodiment of the member for controlled compression of the at least one seal means and connection of the first tubular member and the second tubular member.
Figure 15B:
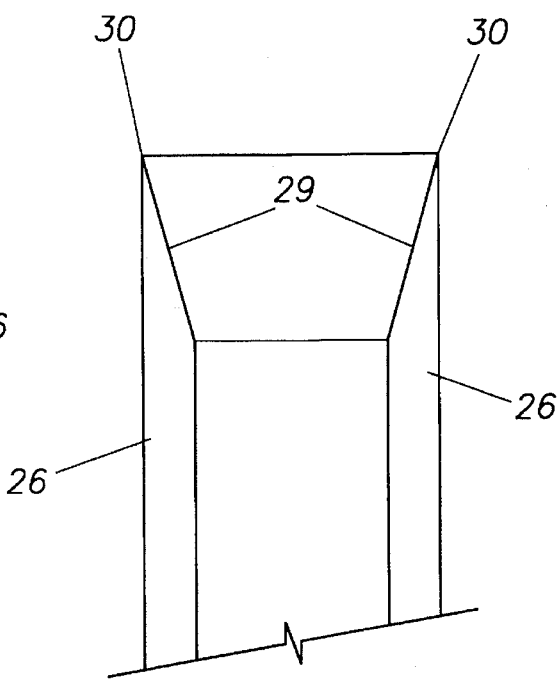
FIG. 15B is an enlarged view of FIG. 14 taken at 15B—15B at the front edge of another embodiment of the member for controlled compression of the at least one seal means and connection of the first tubular member and the second tubular member.

In yet another embodiment as shown in FIG. 11 the member for controlled compression can depart from the substantially flat U-shaped clip 18 and take the form of a U-shaped channeled clip 25 having at least a two sided channeled surface. In this embodiment the effective thickness for creating the controlled compression against the at least one seal 14 is the space between the channels 26. This modified U-shaped channel clip 25 obtains it ability to gradually increase the pressure on the seal 14 by stopping against the second tubular member 13 on the outside edge 27 of the second tubular member 13. Also provided as shown in FIG. 15 are the at least two pair of inclined surfaces 26 which are located along the leading edges 30 of the U-shaped channel clip 25 and incline from the leading edges 30 which is relatively thin to the full thickness 31 of the U-shaped channel clip 25. It should be understood that while the shape of the U-shaped channel clip 25 appears to be different from the U-shaped clip 18 they function in substantially the same way to achieve the same result. In this embodiment there is no need for the apertures 14, but the invention is the same in that there is a stopping against the second tubular member 13 and a gradually increasing pressure against at least one raised surface opposite the at least one raised surface 11 on the first tubular member 10 and the at least one seal means 14 for the creation of controlled compression against the at least one seal 14 as the U-shaped channel clip 25 is put in place. In this embodiment a feral 28 is wedged fitted to the first tubular member 10 to create the at least one raised surface 11 on the first tubular member substantially perpendicular to the axis of connection of the first tubular member 10.

Figure 16:
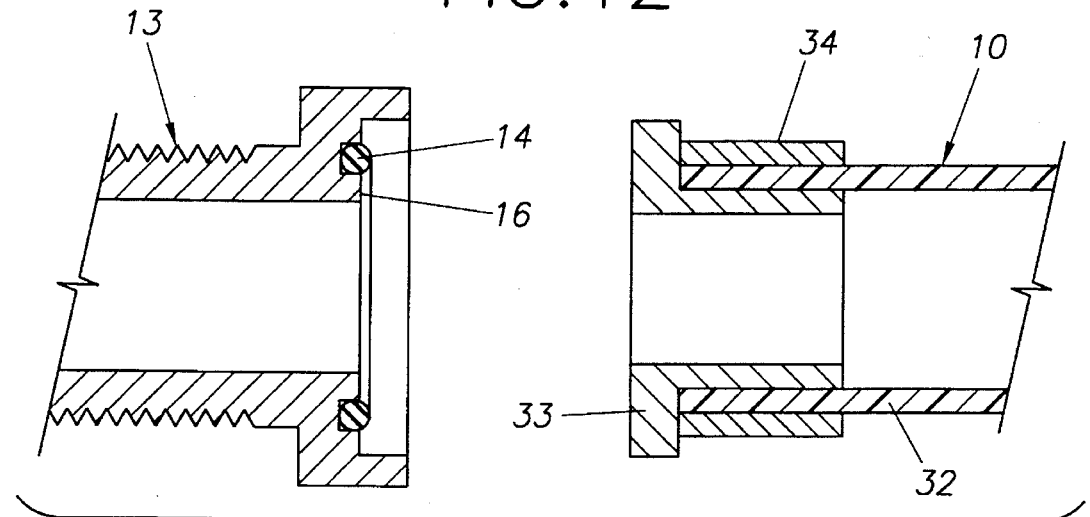
FIG. 16 is another embodiment for use with soft walled tubing like plastic hoses shown in cross section preassembled.
Figure 17:
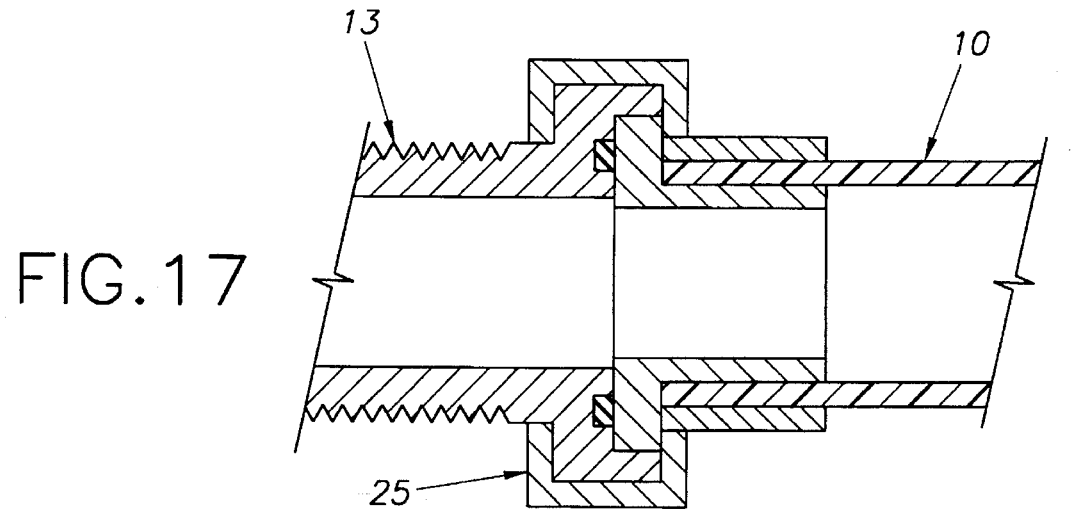
FIG. 17 is the embodiment of FIG. 16 in a completed assembly.
Figure 13:
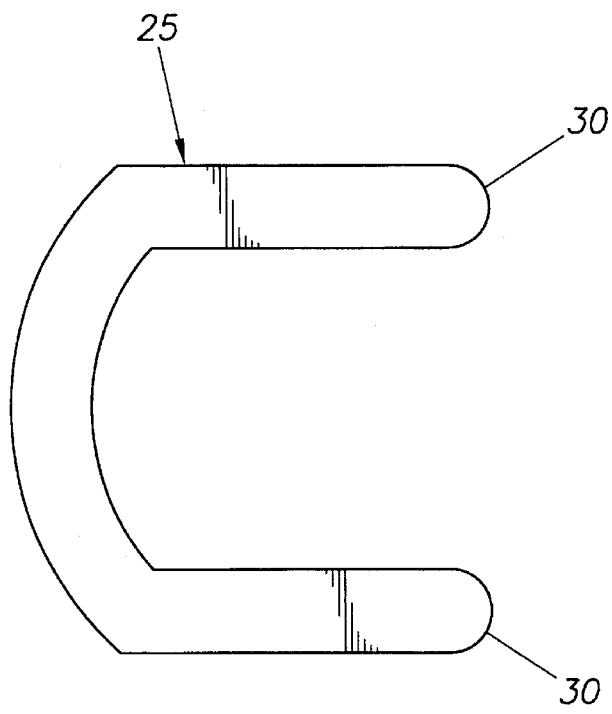
FIG. 13 is a side elevation view of another embodiment of the member for controlled compression of the at least one seal means and connection of the first tubular member and the second tubular member.
Figure 14:
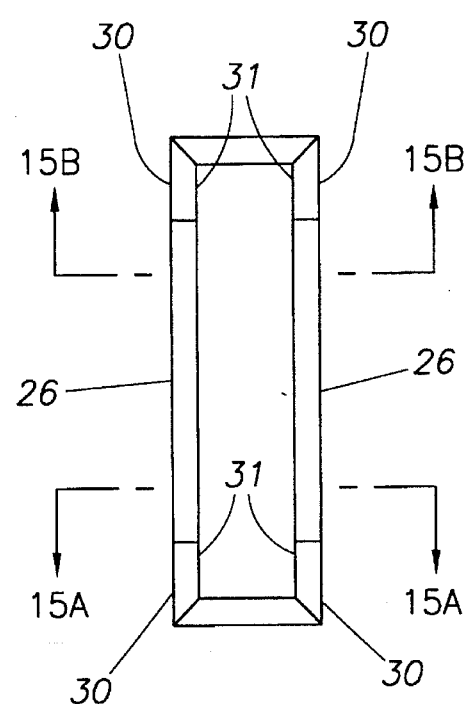
FIG. 14 is a front elevation view of the FIG. 13 embodiment of the member for controlled compression of the at least one seal means and connection of the first tubular member and the second tubular member.

In yet another embodiment of this invention as shown in FIG. 16 and 17 this universal non threaded connector may be used with plastic hose 32 which is very flexible. In the use of this connector system with plastic hose 32 a barbed ring 33 is inserted into the plastic hose 32 and then a ring 34 is fastened over the hose 32 and the barbed ring 32 to secure hose to the at least one raise surface 11 on the first tubular member 10 substantially perpendicular to the axis of connection of the first tubular member 10. Once the at least one raised surface 11 on the first tubular member 10 perpendicular to the axis of connection of the first tubular member 10, this hose 32 is then connected and treated as above described for other embodiments.

It should be appreciated that other and different embodiments of this invention may be made without departing from the scope of this invention and that the above is only some of the possible embodiments which may be used and other may be used without departing from the scope and coverage of this invention.

I claim:

1. A universal non threaded connector means for connecting multiple types of conduit, tubing, hose, and pipe comprising:

a first tubular member means for fluid flow therethrough at least one raised surface on said first tubular member means substantially perpendicular to the axis of connection of said first tubular member means, a second tubular member means having an inside diameter larger than the outside diameter of said at least one raised surface on said first tubular member means substantially perpendicular to the axis of connection for receiving said first tubular member means and said at least one raised surface on said first tubular member means substantially perpendicular to the axis of connection, at least one seal means between said at least one raised surface on said first tubular member means substantially perpendicular to the axis of connection of said first tubular member means and said second tubular member means for forming a seal therebetween, and a U-shaped clip means open on one end having at least a 1st and 2nd surface and at least two inclined surfaces on said open end for controlled compression of said at least one seal means between said second tubular member means and said at least one raised surface on said first tubular member means substantially perpendicular to the axis of connection of said first tubular member means and for connecting said first and second tubular member means as said U-shaped clip means is installed.

2. A universal non threaded connector means for connecting multiple types of conduit, tubing, hose, and pipe as in claim 1 wherein said U-shaped clip means for controlled compression further comprises said at least two inclined surfaces are inclined substantially between said at least 1st and 2nd surfaces and upward and away from said open end of said U-shaped clip means for gradually increasing pressure from substantially no pressure to the proper pressure for controlled compression of at least one seal means and said at least 1st and 2nd surfaces are for holding said second tubular like member means and said at least one raised surface on said first tubular member means substantially perpendicular to the axis of connection of said first tubular member means for fluid in connection.

3. A universal non threaded connector means for connecting multiple types of conduit, tubing, hose, and pipe as in claim 2 wherein said means for gradually increasing pressure further comprises at least a pair of aperture means through said second tubular member means for receiving said U-shaped clip means for gradually increasing pressure by sliding said at least two inclined surfaces therethrough and for sliding engagement of said 1st and 2nd surfaces until providing a stop on said second tubular member means at said at least a pair of apertures therethrough for one of said 1st or 2nd surfaces and for said other surface of said U-shaped clip means to engage said at least one raised surface on said first tubular member means to allow controlled compression and holding of said at least one seal means.

4. A universal non threaded connector means for connecting multiple types of conduit, tubing, hose, and pipe as in claim 3 wherein said means for gradually increasing pressure further comprises said U-shaped clip means having at least two inclined surfaces on said open end of said U-shaped clip means for gradually increasing said pressure for controlled compression of said at least one seal means and at least a 1st and 2nd surface for holding said second tubular like member means and said at least one raised surface on said first tubular member means substantially perpendicular to the axis of connection of said first tubular member means in connection as said U-shaped clip is installed.

5. A universal non threaded connector means for connecting multiple types of conduit, tubing, hose, and pipe as in claim 4 wherein said U shaped clip means comprise edges at said open end thereof and a substantially flat body having at least two inclined surfaces located on at least one side of said open end edges of said U-shaped clip means for gradually increasing pressure on said seal means as said U-shaped clip means is put in place, and a portion of said substantially flat body for stopping said U-shaped clip means in holding engagement.

6. A universal non threaded connector means for connecting multiple types of conduit, tubing, hose, and pipe as in claim 5 Wherein said U-shaped clip means has at least two inclined surfaces which have a height relative to the position of said seal means and said at least a pair of aperture means for receiving said U-shaped clip means and said second tubular member means forming said aperture provides a stop for one of said 1st and 2nd surfaces of said U-shaped means for gradually increasing said pressure for controlled compression of said at least one seal means from 5% to 50% of said seal means as said U-shaped clip means is put in place.

7. A universal non threaded connector means for connecting multiple types of conduit, tubing, hose, and pipe as in claim 2 wherein said means for gradually increasing pressure further comprises a modified U-shaped clip where in said 1st and 2nd surfaces have at least a two sided channeled surface along the inside of said 1st and 2nd surfaces of said modified U-shaped clip for insertion about said second tubular member means and said at least one raised surface for gradually increasing said pressure for controlled compression against said at least one raised surface opposite said at least one raised surface on said first tubular member means substantially perpendicular to the axis of connection of said first tubular member means and said at least one seal means for the creation of controlled compression against said at least one seal means as said modified U-shaped clip is put in place.

8. A universal non threaded connector means for connecting multiple types of conduit, tubing, hose, and pipe as in claim 7 wherein said means for gradually increasing pressure further comprises a raised surface perpendicular to the axis of connection on said second tubular member means for stopping one side of said at least two sided channel of said modified U-shaped clip and said other side of said at least two sided channel of said modified U-shaped clip for engaging said raised surface on said first tubular member means for controlled compression.

9. A universal non threaded connector means for connecting multiple types of conduit, tubing, hose, and pipe as in claim 8 wherein said at least two sided channel of said modified U-shaped clip means has at least two inclined surfaces on said open end of said modified U-shaped clip and said at least two inclined surfaces have a height relative to said position of said seal means and said raised surface perpendicular to the axis of connection on said first tubular member means for providing a controlled compression of from 5% to 50% of said seal means as said U-shaped clip means is put in place.

10. A universal non threaded connector means for connecting multiple types of conduit, tubing, hose, and pipe as in claim 1 wherein said means for at least one seal means is a face seal between said second tubular member means and said at least one raised surface on said first tubular member means substantially perpendicular to the axis of connection of said first tubular member means.

11. A universal non threaded connector means for connecting multiple types of conduit, tubing, hose, and pipe as in claim 1 wherein said first tubular member means for fluid is composed of two materials and said material on the inside of said first tubular member means has a sealing quality and said material on the outside of said first tubular member having rigid qualities and said portion for connection of said tube is flared to provide said inside of said material for forming said seal means and said outside material for forming said raised surface on said first tubular member means substantially perpendicular to the axis of connection of said first tubular member means.

12. A universal non threaded connector means for connecting multiple types of conduit, tubing, hose, and pipe as in claim 1 wherein said at least one raised surface on said first tubular member means substantially perpendicular to the axis of connection of said first tubular member means is a raised bead formed on said first tubular member means.

13. A universal non threaded connector means for connecting multiple types of conduit, tubing, hose, and pipe as in claim 1 wherein said at least one raised surface on said first tubular member means substantially perpendicular to the axis of connection of said first tubular member means further comprises a ferrule means for attachment about said first tubular member means having a raised surface for forming said at least one raised surface on said first tubular member means substantially perpendicular to the axis of connection of said first tubular member means after attachment of said ferrule means to said first tubular member means.

14. A universal non threaded connector means for connecting multiple types of conduit, tubing, hose, and pipe as in claim 1 wherein said at least one raised surface on said first tubular member means substantially perpendicular to the axis of connection of said first tubular member means further comprises a raised means for attachment to said first tubular member means and a means for making said first tubular member means rigid proximate to said point of attachment of said raised means and for holding said first tubular member means when said raised means and said means for making said first tubular member means rigid are connected.

15. A universal non threaded connector means for connecting multiple types of conduit, tubing, hose, and pipe as in claim 14 wherein said means for making said first tubular member means rigid proximate to said point of attachment further comprises a barbed ring means for insertion into said 1st tubular member means and a ring means positioned over said 1st tubular member means and said barbed ring means inserted into said 1st tubular member means for holding said first tubular member and positioning said raised means attached to said first tubular member.

\* \* \* \* \*